United States Patent

[11] 3,610,784

[72] Inventor Theodore W. Rundell
 Tecumseh, Mich.
[21] Appl. No. 20,994
[22] Filed Mar. 19, 1970
[45] Patented Oct. 5, 1971
[73] Assignee Tecumseh Products Company
 Tecumseh, Mich.

[54] ELECTRIC MOTOR AND COMPRESSOR CONSTRUCTION
 26 Claims, 16 Drawing Figs.
[52] U.S. Cl. .................................................. 417/415,
 310/254, 417/902
[51] Int. Cl. ............................................. F04b 35/04,
 H02k 1/12
[50] Field of Search........................................ 417/415,
 902, 410; 310/254

[56] References Cited
UNITED STATES PATENTS
2,905,372 9/1959 LaFlame ..................... 417/415 X
3,407,990 10/1968 Schaefer...................... 417/902

Primary Examiner—Robert M. Walker
Attorney—Barnes, Kisselle, Raisch & Choate

ABSTRACT: An electric motor-gas pump unit mounted in a hermetic sealed housing with the end turns of the motor stator windings each arranged in a horseshoe configuration to define two axially aligned winding gaps which register with an unslotted portion of the laminated stator core so that the same can serve as a mounting platform for the pump. The stator core thus serves its usual function as a support for the windings and as a flux conductor, and in addition serves as a supporting frame for the pump unit. One or two bearing arms are also cantilever mounted on the unslotted portion of the stator core to serve as the journal for the rotor shaft-crankshaft of the motor-pump unit.

PATENTED OCT 5 1971 3,610,784

INVENTOR
THEODORE W. RUNDELL

BY Barnes, Kisselle, Raisch & Choate,

ATTORNEYS

INVENTOR
THEODORE W. RUNDELL
BY
Barnes, Kisselle, Raisch & Choate
ATTORNEYS

INVENTOR
THEODORE W. RUNDELL

BY Barnes, Kisselle, Raisch & Choate,

ATTORNEYS

ELECTRIC MOTOR AND COMPRESSOR CONSTRUCTION

This invention relates to electric motors and motor driven piston pumps, and more particularly to improvements in the construction of motor compressor units for hermetic compressors used in refrigeration systems, air conditioning and similar applications.

An object of the present invention is to provide an electric motor having field windings arranged in a manner such that a pump or other device to be driven by the motor may be mounted directly on the stator of the motor to thereby provide a compact and economical integrated pump and motor unit.

Another object is to provide an improved heremetic compressor incorporating an electric motor and compressor pump unit of the above character to hereby achieve a reduction in the axial dimension of the compressor casing as well as substantial savings in the cost and weight of the heremetic compressor assembly.

Other objects, features and advantages of the present invention will become apparent from the following detailed description taken in conjunction with the accompanying drawings wherein:

Figures 1, 2, 3:
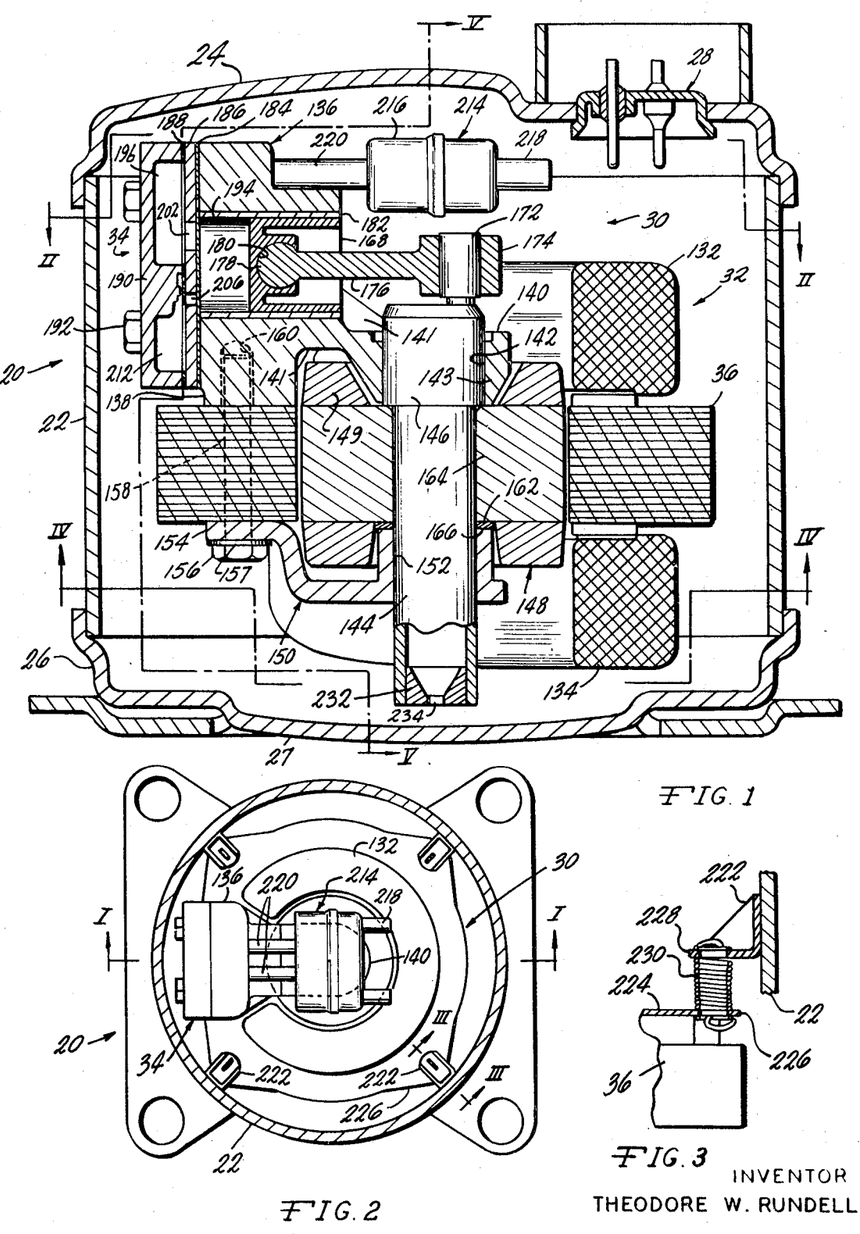
FIG. 1 is a vertical sectional view taken on the line I—I of FIG. 2 illustrating a hermetic compressor incorporating one embodiment of an electric motor and pump construction of the present invention.
FIG. 2 is a horizontal sectional and top plan view taken on the line II—II of FIG. 1 but on a reduced scale.
FIG. 3 is a fragmentary vertical sectional view taken on the line III—III of FIG. 2 but enlarged thereover and illustrating structure by which the motor-compressor unit is mounted to the casing.

Referring in more detail to the accompanying drawings, FIG. 1 illustrates a hermetic compressor assembly 20 comprising a three-part hermetically sealed casing made up of a cylindrical center section 22 and top and bottom caps 24 and 26 respectively attached by welded sealed joints to section 22. A conventional glass terminal unit 28 is provided in top 24 for connection to the internal and external electrical leads (not shown) for energizing the electric motor 32 of the motor-compressor unit 30 which is mounted inside the casing. Motor-compressor unit 30 preferably includes an induction-type electric motor illustrated by way of example herein as a split-phase induction motor 32 with a distributed winding type stator and cast rotor and adapted to operate on single phase 60-cycle 110 volt nominal alternating current, and a single cylinder reciprocating piston gas pump 34 mounted directly on the motor in accordance with a principal feature of the present invention.

Figures 6, 7, 9:
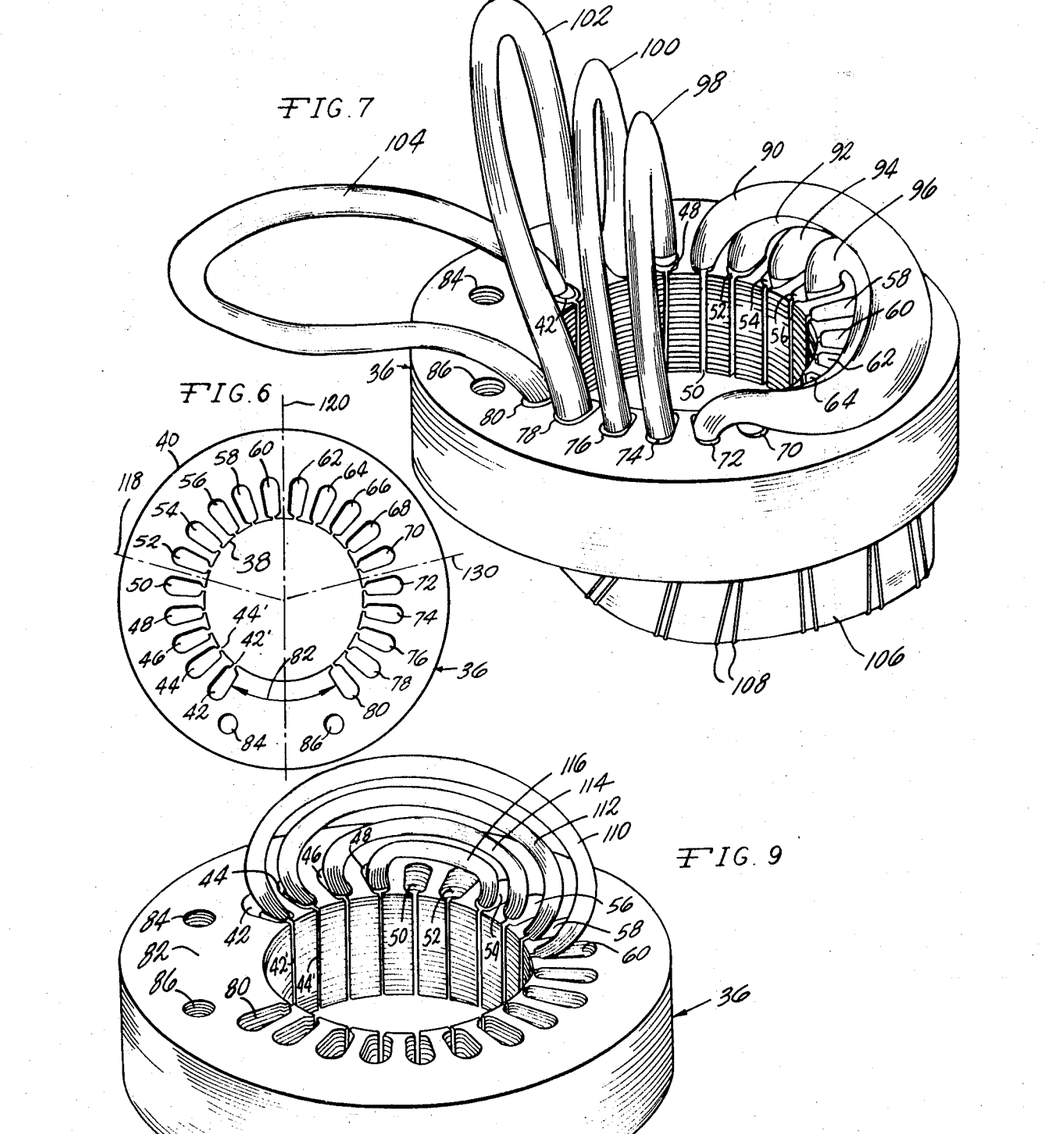
FIG. 6 is a top plan view of the stator core of the electric motor shown by itself and on a reduced scale.
FIGS. 7, 8, 9 and 10 are perspective views of one embodiment of a stator used in the electric motor of the invention showing various stages of the installation of the run and start windings on the stator core in accordance with the present invention.

Motor 32 comprises a laminated stator core 36 of annular configuration (FIG. 6) made up of a plurality of laminations made of the usual ferromagnetic material normally employed in electric motor stator core construction. Each stator core lamination is preferably individually bonded to the adjacent lamina by a layer of adhesive preferably an epoxy type adhesive, which prevents lateral slippage of the lamina and imparts a high degree of strength to the stator lamination so that it can also serve as a frame for supporting pump 34 and other components of unit 30. As best seen in FIG. 6, the stator core 36 illustrated herein by way of example has concentric cylindrical inner and outer peripheries 38 and 40 respectively with a circular row of winding slots 42–60, herein illustrated by way of example as 20 in number, which extend axially through the stator and are open at their upper and lower ends. Each slot is of generally oval cross section and extends radially outwardly from an associated winding insertion slot 42′, 44′, etc. in the inner periphery 38 of the stator, the radially outer ends of slots 42–80 being disposed about midway between the inner and outer peripheries of the stator.

As will be noted from FIGS. 6–10 inclusive, core 36 has an unslotted portion 82 extending approximately 60° circumferentially between the end slots 42 and 80 (see FIG. 6). The unslotted portion 82 of the stator is thus imperforate except for two bolt holes 84 and 86 extending axially therethrough, and thus has axially opposite exposed flat top and bottom surfaces adapted to serve as mounting platforms for the cylinder block 136 of pump 34 and the outboard bearing bracket 150 respectively, as described in more detail hereinafter. In cooperation with this interrupted core slot arrangement the distributed run and start windings motor 32 are asymmetrically arranged as best seen in FIGS. 7–10 inclusive to further accommodate the mounting of the pump directly on the stator.

Referring first to FIG. 7, core 36 is shown with two sets of run windings (electrically interconnected as one winding) partially installed on the stator. The distributed run winding which forms the right hand pole of the stator field (as viewed in FIGS. 7 and 8) consists of four coils 90, 92, 94 and 96 having upper and lower end turns which extend beyond the axially opposite top and bottom end surfaces of core 36. The upper end turns of these coils are shown laid down in superimposed relation on the right-hand upper end surface of the stator as viewed in FIG. 7. Coil 96 is wound so that one run extends through stator slot 56 and the other run through stator slot 66, and the upper end turn portion of coil 96 extends circumferentially and lies against the upper most lamination of stator 36. Similarly, coil 94 is wound through slots 54 and 68, coil 92 through slots 52 and 70, and coil 90 through slots 50 and 72, and the upper end turns of coils 94, 92 and 90 also extend circumferentially above the stator in successive superposed relation to the upper end turn of coil 96. Coils 90–96 thus form a distributed winding arrangement for generating a right-hand electromagnetic field pole centered between slots 60 and 62 on an imaginary diametrical line 120 (FIG. 6).

Figure 8:
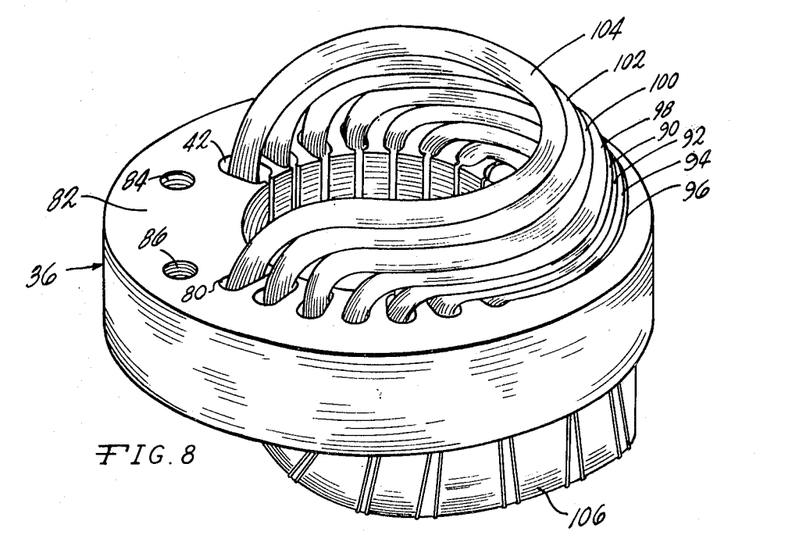

The left-hand field pole as viewed in FIGS. 7 and 8 is also formed by a distributed array of four run winding coils 98, 100, 102 and 104. Coil 98 is wound through slots 48 and 74, coil 100 through slots 46 and 76, coil 102 through slots 44 and 78 and coil 104 through slots 42 and 80. The upper end turns of coils 98–104 are shown loosely separated in FIG. 7 to better illustrate the progressive increase in the length of each of these coils. The upper end turns of coils 98, 100, 102 and 104 are longer than the end turns of coils 90–96 so that they are of sufficient length to be laid down upon one another over the upper end turns of coils 90–96 as shown in FIG. 8. Hence the upper end turns of all eight coils 90–104 in their final assembled position extend circumferentially in successive superimposed relationship from their respective stator slots around the right end of core 36 as shown in somewhat exaggerated diagrammatic form in FIG. 8.

It is to be understood that the lower end turns of each of the coils 90–104 are likewise disposed in a similar successive superposed array beneath and adjacent the bottom end surface of core 36. The final folded assembly of all run and start winding lower end turns in shown in FIGS. 7-10 inclusive as an indistinguishable mass of windings 106 which are held together with suitable binding cords 108 as in conventional motor winding construction practice. It is also to be understood that the upper end turns of the run and start windings are likewise arranged and secured as indicated at 132 in FIGS. 1, 2 and 5. However, only the run windings are shown in FIG. 7 and 8 and only the upper end turns of the start windings are shown in FIGS. 9 and 10, the upper end turns being shown somewhat exaggerated and separately identifiable in these views in order to facilitate understanding.

Although the end turns of the left run winding coils 98-104 are pulled pack and down from their FIG. 7 position to their FIG. 8 position so as to overlie the right-hand side of core 36, the effective electrical center or pole of the field generated by these left-hand coils lies along line 120 midway between bolt holes 84 and 86 so as to bisect the mounting portion 82 of the stator. Hence the right and left field poles of the continuous run winding remain diametrically opposed to one another to conform to split phase induction motor practice despite the asymmetrical arrangement of the individual coils of the main or run winding.

The arrangement and distribution of the distributed coil auxiliary or start winding is also altered from conventional split phase distributed winding motor construction. Thus, referring to FIG. 9, the first half of the start winding consists of four progressively shorter coils 110, 112, 114 and 116 arranged with their respective end turns projecting above and below (axially beyond) core 36. The smallest of these coils 116 is wound through slots 48 and 54, the next larger coil 114 is wound through slots 46 and 56, coil 112 through slots 44 and 58 and coil 110 through slots 42 and 60. The start winding coils 110-116 are disposed radially inwardly of those run winding coils which extend through the same slots as described previously. In their final assembled position the end turns of coils 110-116 are nested compactly against the inner periphery of the surrounding run winding end turns and held thereagainst by binding cords similar to cords 108. For clarity, in FIG. 9 the upper end turns of the start winding coils 110-116 are shown separated and exaggerated in length, their final assembled position more nearly resembling the relationship of these end turns as shown in FIG. 10. The lower end turns of start windings 110-116 are arranged in a similar manner beneath core 36.

Figure 10:
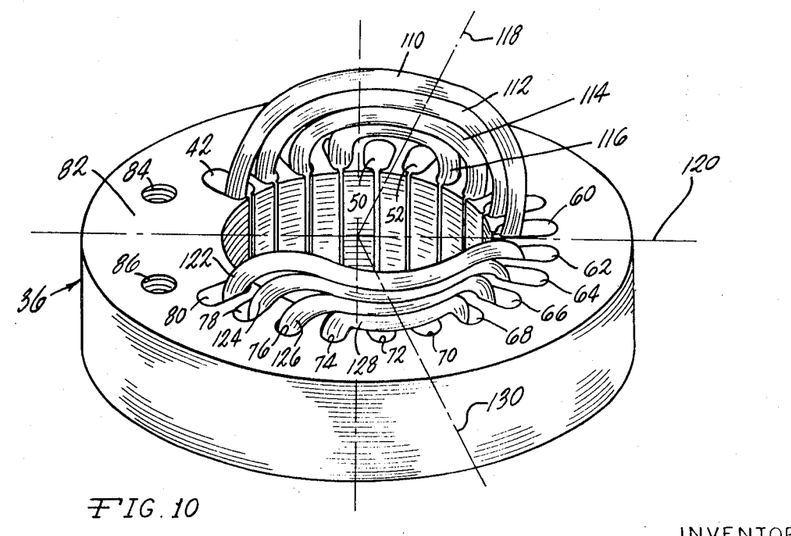

As shown in FIG. 10, the electrical center or pole of the auxiliary or start field generated by the distributed array of the coils 110-116 is centered along a radial line 118 running midway between slots 50 and 52 (FIGS. 6 and 10), or at an angle of about 75° from the diametrical line 120 which represents the common axis of the left and right electrical poles of the run winding.

Referring to FIG. 10, the second half of the start winding likewise consists of four coils 122, 124, 126 and 128 arranged in a distributed array symmetrically about line 120 and opposite start winding coils 110-116. Coil 122 is thus wound through slots 80 and 62, coil 124 through slots 78 and 64, coil 126 through slots 76 and 66, and coil 128 through slots 74 and 68. Thus, the electrical center or pole of the auxiliary field generated by start winding coils 122-128 lies along a line 130 likewise oriented about 75° from center line 120, but on the opposite side thereof from line 118.

With the above unique array of start and run windings, adequate space is provided for mounting pump 34 and its associated motor shaft bearing brackets in nested relation among the stator end turns and directly against portion 82 of core 36 to thereby from a very compact motor-pump subassembly wherein core 36 serves its normal electrical function as a winding support and flux conductor, and in addition serves as the main supporting frame for both the pump and motor components.

Returning again to FIGS. 1-5 inclusive, it will now be better understood that the integrated mass of upper end turns of the start and run windings are illustrated semischematically as an annular parted ring 132 above core 36 (FIGS. 1 and 2), nd likewise the lower end turns of the start and run windings are similarly shown as a parted annular ring 134 beneath core 36 (FIGS. 1 and 4). As indicated above, the open portion 82 of core 36, which is free or clear of any windings, supports a cast aluminum cylinder block 136 which has a mounting boss 138 on its underside seating directly against the upper surface of portion 82 of core 36. Block 136 has cast integrally therewith an inboard bearing bracket 140, which includes a pair of downwardly sloping reinforcing ribs 141 (FIG. 1), and which extends radially inwardly of the stator. The inner end of bracket 140 has a rounded dependent bearing hub portion 143 beveled on its underside. Hub 143 has a through-bore 142 oriented coaxially with stator 36. The rotor shaft 144 of motor 32 has an enlarged upper end or hub 146 which is journaled in bore 142 for rotation about a vertical axis centrally of the stator. A conventional cast rotor 148 for a split-phase induction motor is secured by a press fit to shaft 144 for rotation therewith. It is to be noted that bracket 140 and boss 138 are cut away on their undersides to form an arcuate notch 141 to provide running clearance for the upper end turns 149 of rotor 148.

Shaft 144 is also supported in an outboard bearing bracket 150 having a hub portion 152 serving as the lower journal for shaft 144. Bracket 150 is cantilever mounted at its left hand end 154 (as viewed in FIG. 1) against the underside of portion 82 of core 36 by a pair of mounting studs 156 and 158 (FIG. 4) inserted respectively through associated holes in bracket 150 and bolt holes 86 and 84 respectively. The upper ends of studs 156 and 158 are threadably received in threaded blind bores 160 (FIG. 1) formed in the underside boss 138 of block 136, thus aligning and clamping block 136 and bracket 150 securely against the upper and lower surfaces of portion 82 of stator 36.

Figure 5:
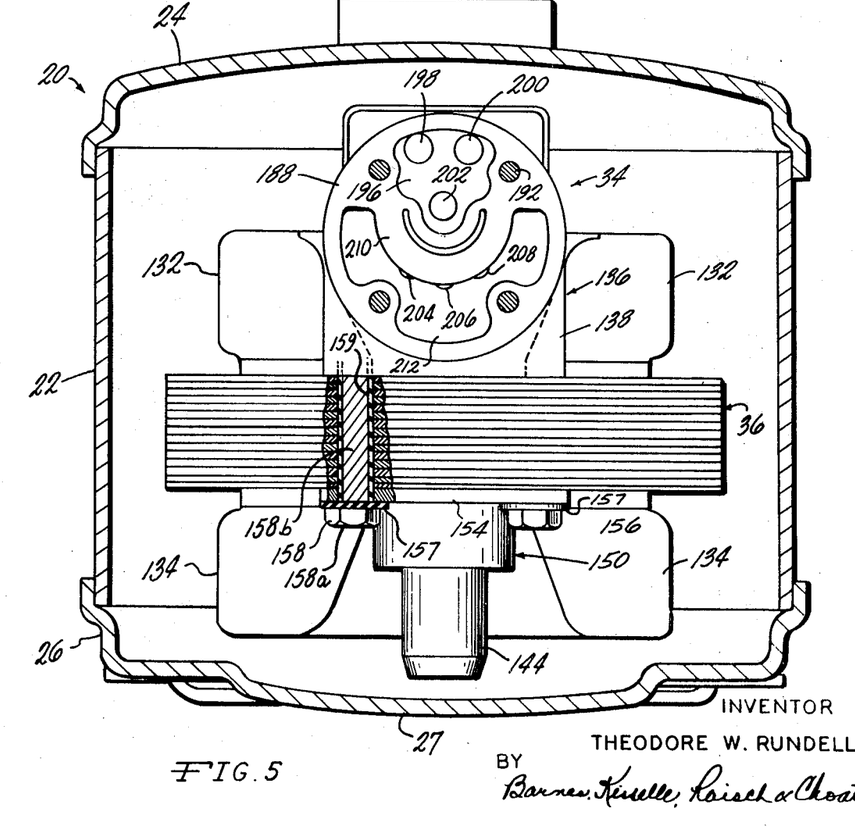
FIG. 5 is a vertical section and end elevational view taken on the line V—V of FIG. 1 and drawn to the scale of FIG. 1, and with a portion broken away to better illustrate the mounting stud construction.

As shown in FIG. 5, preferably the head 158a and shank 158b of each of the studs 158 and 156 are electrically insulated from the adjacent surfaces of bracket 154 and the laminations of core 36 by an insulating washer 157 and an insulating coating or tube 159 applied to shank 158b. This insulation serves to prevent flux-induced circulation of eddy currents in what would otherwise be a closed electrical circuit made up of bolts 156 and 158, bracket 154 and boss 138.

The subassembly of shaft 144 and rotor 148 is vertically supported on a thrust washer 162 disposed between the underside of the core 164 of rotor 148 and the machined upper end surface 166 of hub 152. The driving connection between the motor shaft 144 and the piston 168 of pump 34 may be any suitable crank mechanism, such as a scotch yoke, but as shown herein comprises a crankpin 172 mounted eccentrically on the upper end of the shaft hub 146, pin 172 being journaled in the big end 174 of a connecting rod 176. The small end 178 of rod 176 is spherical in shape and received in a spherically shaped cavity 180 formed in piston 168 and swedged about its entrance after insertion of end 178 to provide a ball and socket connection between rod 176 and piston 168. Piston 168 reciprocates in a cast iron cylinder liner 182 mounted in block 136.

The valving and chambering of pump 34 generally follows a conventional hermetic compressor practice and consists of a combined valve plate gasket and intake valve leaf to form intake valve leaf plate 184, valve plate 186, combined discharge valve leaf and head gasket to form discharge valve plate 188, and head 190, all of which are clamped in assembled relation against block 136 by four head bolts 192 (FIGS. 1 and 5). The working chamber 194 of pump 34 communicates with the intake manifold chamber 196 (FIG. 1) via one intake port 202 (FIG. 5) controlled by the aforementioned intake valve of plate 184. Compressed refrigerant gas is discharged from chamber 194 on the pumping stroke of piston 168 via three discharge ports 204, 206 and 208 (FIG. 5), past a semicircular leaf-type discharge valve 210, into a discharge manifold chamber 212.

The gaseous refrigerant is conducted from the interior space of casing 22-26 to chamber 196 via a suction tube and muffler assembly 214. This assembly consists of muffler casing 216 having a pair of inlet tubes 218 leading to the interior of casing 216, suitable muffling baffles within the casing and a pair of outlet tubes 220. These tubes are inserted into corresponding bores 221 (shown in the manifold block of FIG. 13) in the upper portion of block 136 which in turn communicate with a chamber 221' formed in the block above cylinder liner 182. Chamber 221' communicates with suction chamber 196 via two ports 198 and 200 shown in FIG. 5.

The pressurized refrigerant is conducted from discharge chamber 212 via a suitable tubular discharge conduit (not shown) which extends within the interior space of casing 22 and through a sealed aperture in the wall of the casing to provide an exterior outlet connection in a conventional manner.

Figure 4:
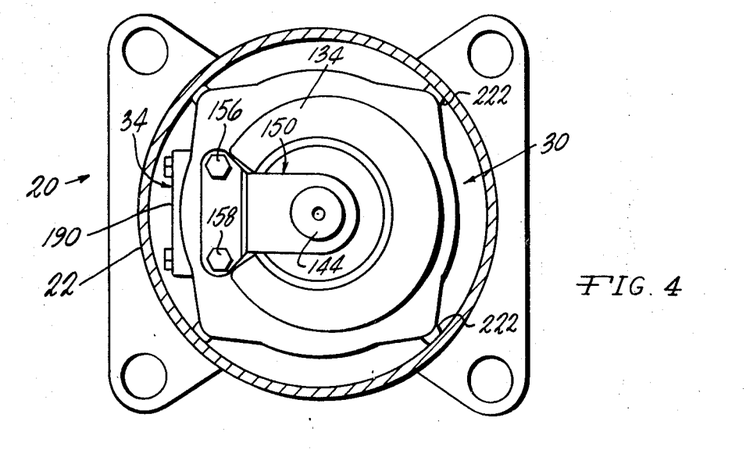
FIG. 4 is horizontal sectional and bottom plan view taken on the line IV—IV of FIG. 1 on the same scale as FIG. 2.

Preferably motor-compressor unit 30 is resiliently suspended within casing 22 by a four-point spring suspension best seen in FIGS. 2, 3 and 4. Thus, four right angle channel brackets 222 are arranged at 90° intervals around the inner wall of casing 22 (FIG. 2) and spot welded thereto as best seen in FIG. 3. The uppermost lamination 224 of stator core 36 is provided with four radially outwardly projecting ears 226 which extend beneath the horizontal leg 228 of the associated bracket 222. Suitable slots are formed in each leg 228 and ear 226 for respectively receiving the opposite end turns of a tension coil spring 230, whereby the motor-compressor unit 30 is resiliently suspended by the four springs 230 from the four brackets 222.

The bottom cap 26 of the hermetic casing is formed with a central depression 27 which forms a sump in which oil collects to provide lubrication for the sealed hermetic compressor in accordance with conventional practice. Positive lubrication is provided by a centrifugal-type oil pump 232 which is mounted in the lower end of the hollow shaft 144 such that the inlet aperture 234 of pump 232 always remains submerged in the pool of oil in the casing sump. When shaft 144 is rotated by a motor 32, pump 232 forces oil upwardly within shaft 144, from which it is conducted via suitable oil passages (not shown) to lubricate the upper and lower shaft bearings 140 and 152. Further oil slinging passages and ports of known construction may be provided in the shaft 144 and/or hub 146 to lubricate the piston, connecting rod and associated bearings.

In operation, motor 32 is energized via the conventional lead-in connections and electrical control equipment, including suitable capacitance or resistance start circuitry associated with the energizing circuit for start winding 110–116 and 112–128. Starting torque is developed by the angular spacing of the auxiliary poles relative to the main poles and the electrical phase difference between the main and auxiliary winding currents. This torque is developed in rotor 148 electromagnetically, thereby rotating shaft 144 which, through rod 176, imparts reciprocation to piston 168, thereby causing gaseous refrigerant to be withdrawn from the interior space of the casing and pumped by pump 34 to the discharge outlet of the compressor, as will be well understood by those skilled in the art from the foregoing description.

Despite the asymmetrical redistribution of the start and run windings into what may be termed a "horseshoe" configuration as viewed in FIGS. 2 and 4, it has been found that sufficient starting as well as running torque is developed by motor 32 to satisfy commercial refrigeration requirements. This has been achieved without any significant increase in power input to the motor. Preferably cylinder block 136 and integral inboard bearing bracket 140 are constructed of cast aluminum or structural aluminum alloys, or other suitable nonmagnetic material. Use of such nonmagnetic materials in the more massive parts adjacent core 36 has been found to be critical in accomplishing an adequate starting-torque versus crankshaft-speed curve. However, mounting bolts 156 and 158 may be constructed of high-strength ferromagnetic material such as steel if properly electrically insulated as described previously. Also, in order to provide wear resistance and long life, cylinder liner 82 is made of cast iron and piston 168 is constructed of steel or cast iron.

Successful results have been obtained using electric motors in the 1/12 to 1/6 horsepower range constructed in accordance with the drawings to operate the compressor in a 300 to 500 B.t.u. per hour capacity range. These motors are generally of the asynchronous split-phase single-phase induction type designed to run at about 3,450 r.p.m. with a stator stack height of about 1⅛ to 1½ inches within the parameters as set forth above and in the examples as specified hereinafter.

By way of further illustration, and not by way of limitation, two successful motor-pump units 30 constructed in accordance with the invention utilized the following design criteria:

EXAMPLE A

⅛ HP, 115-volt, 60-cycle, stack height 1⅛"

Start winding data:
- Resistance........ 16.7 ohms.
- Wire size........... No. 26 AWG (1 strand).
- Total length........ 400 ft.
- Poles............... Series.

| Coils (as numbered in FIG 10) | 110 / 122 | 112 / 124 | 114 / 126 | 116 / 128 |
|---|---|---|---|---|
| No. forward turns | 100 | 30 | 29 | 20 |
| No. reverse turns | 67 | | | |
| Total turns | 167 | 30 | 29 | 20 |

Main winding data:
- Resistance......... 4.80 ohms.
- Wire size........... No. 23 AWG (2 parallel strands).
- Total length........ 930 ft.
- Poles............... Series.

| Coils (as numbered in FIG. 7) | 104 | 102 | 100 | 98 | 90 | 92 | 94 | 96 |
|---|---|---|---|---|---|---|---|---|
| No. turns | 25 | 48 | 54 | 60 | 60 | 54 | 48 | 25 |

- Stator O.D......... 4 15/16 in.
- Stator I.D.......... 2.400 in.
- Rotor I.D.......... 2.376 in.

Pump data:
- Bore............... .822 in.
- Stroke............. .466 in.
- Displacement...... .247 in.³/revolution.
- Oil charge......... 10 oz.
- Suction press. (rating point).  4.5#/in.²
- Head press. (rating point).  180#/in.²
- Pumping rate..... 320 B.t.u./hr.

EXAMPLE B

⅙ HP, 115-volt, 60-cycle, stack height 1½"

Start winding data:
- Resistance......... 12.28 ohms.
- Wire size........... No. 25 AWG (1 strand).
- Total length........ 400 ft.
- Poles............... Series.

| Coils (as numbered in FIG. 10) | 110 / 122 | 112 / 124 | 114 / 126 | 116 / 128 |
|---|---|---|---|---|
| No. forward turns | 89 | 27 | 27 | 21 |
| No. reverse turns | 26 | | | |
| Total turns | 151 | 27 | 27 | 21 |

Main winding data:
- Resistance......... 3.1 ohms.
- Wire size........... No. 22 AWG (2 parallel strands).
- Total length........ 770 ft.
- Poles............... Series.

| Coils (as numbered in FIG. 7) | 104 | 102 | 100 | 98 | 90 | 92 | 94 | 96 |
|---|---|---|---|---|---|---|---|---|
| No. turns | 17 | 38 | 43 | 48 | 48 | 43 | 38 | 17 |

- Stator O.D......... 4 15/16 in.
- Stator I.D.......... 2.400 in.
- Rotor O.D......... 2.376 in.

Pump data:
- Bore............... .956 in.
- Stroke............. .466 in.
- Displacement...... .334 in.³/revolution.
- Oil charge......... 8 oz.
- Suction press. (rating point).  4.5#/in.²
- Head press. (rating point).  180#/in.²
- Pumping rate..... 430 B.t.u./hr.

From the foregoing description it will now be evident that a motor-pump unit constructed in accordance with the principles of the present invention provides a simplified and compact arrangement without sacrificing motor or pump performance. By mounting the pump directly on the stator and using the stator core as the supporting frame for the motor and pump unit, there is no longer any need for the usual cup- or bell-shaped casting hitherto used in hermetic compressors to form the inboard bearing bracket and to mount and center the motor shaft in relation to the stator. Such bell-shaped bearing brackets of prior art compressors are relatively large and heavy cast parts which necessitated a rather large structural height (in vertical shaft pumps or compressors) or axial dimension because the compressor or pump along with its associated drive means have to be mounted on the side of the bearing bracket remote from the electric motor. By doing away with this heavy and costly part, the present invention significantly reduces the weight and cost of the total unit. In addition, the exterior dimensions are considerably reduced because the cylinder block is nested directly against the stator in the space provided by opening up the gap in the end turns of the stator windings of the motor.

The arched configuration of the combined bearing bracket 140 and boss 138 further contributes to the axial compactness of the unit and permits the use of a rotor 148 of conventional cast aluminum construction. Although stator core 36 has a unique winding slot arrangement, it nevertheless does not depart so far from conventional stator design as to preclude use of existing automatic motor winding machinery and existing stator manufacturing equipment to manufacture stator core 36. The bonding of the stator laminations to one another by an epoxy adhesive adds little to the cost of stator construction but greatly increases its strength so that it can serve as the primary structural support for the motor-compressor unit 30.

It is to be understood that the principles of the present invention can be applied to other types of electric motors, such as split phase induction motors, capacitor start-capacitor run induction motors (two-value capacitor induction motors) and permanent split capacitor induction motors. For example, such single phase induction motors may be built as two-pole motors as described previously herein or may be a four-pole type having a stator made up of two main or run windings which are placed at right angles to each other around the stator. This modification uses a distributed multiple coil arrangement wherein the coils forming one-half of one of the main windings is arranged in a stator core constructed similarly to core 36 in a manner similar to coils 98–104. The remaining three sets of winding coils likewise are interrelated following the relationship of coils 90–96, 110–116 and 122–128. In addition, suitable resistance or capacitance start circuitry may be employed to alter the phase angle relationship between the windings to partially or wholly compensate for any angular physical displacement of the coils from the usual 90° spacing. In either instance the windings are preferably reoriented only insofar as it is necessary to open up a single mounting portion 82 on the stator core. Hence, the arrangement of the invention permits the use of a maximum number of field windings withing the space available so as to retain high-operating efficiency while achieving a minimum dimension package.

It is also to be understood that the invention is not limited to the particular 20-slot stator 36 described by way of example herein, but may also be applied to stators having, for example, 18 or 22 slots. Also, successful results have been obtained with slots of uniform radial dimension as shown in FIG. 6 as well as with a modification thereof wherein slots 60 and 62 are slightly shorter in radial dimension than the remaining slots of the stator. Although the illustrative example of the motor described previously herein employs four coils per pole in the starting winding, it is possible to vary this and to use, for example, three or five coils per pole. The stator cores 36 of the motors employed in accordance with the invention may have their laminations secured together only by adhesive bonding as described previously herein with reference to stator 36, or the stator may be both core bonded and welded, or core bonded and cleated.

FIGS. 11–16 inclusive illustrate a modified motor-compressor unit 20' of the present invention which is similar to unit 20 but modified with respect to the bearing support structure and associated rotor shaft-pump crankshaft. In FIGS. 11–16 inclusive those parts corresponding to the parts described previously in connection with the motor-compressor 20 are given like reference numerals and their description not repeated herein. The modified unit 20' employs a unibearing support for the rotor shaft-crankshaft 300 wherein a single bearing hub 302, cast integrally with a modified cylinder block 304, is cantilevered from the block to support shaft 300 and in turn rotor 306. Block 304 is mounted in the same manner as block 136 and is preferably constructed of S.A.E. 308 aluminum alloy. A cylinder liner 308 made of cast iron is cast into the block and defines the cylinder bore 310 of the compressor pump.

By way of further explanation, block 304 has a boss 353 (FIG. 13) having a threaded counterbore 354 to receive one end of a compressor discharge tube. Block 304 also has an internal passageway 356 communicating with counterbore 354 at one end and with the discharge chamber 212 at the opposite end of the block. It is also to be understood that the flat upper surface 358 of block 304 is adapted to receive a coverplate (not shown) with suitable gasketing, and is secured to the box by suitable studs to close the chamber 221' described previously.

A mounting boss portion 312 of block 304 is, like the corresponding boss 138 of block 136, seated flat on the upper surface of core 36 in the gap of the upper end turn ring 132 and bearing hub 302 projects radially inwardly to the center of the stator, similar to the inboard bearing hub 140 described previously.

Figures 11, 13, 14, 15, 16:
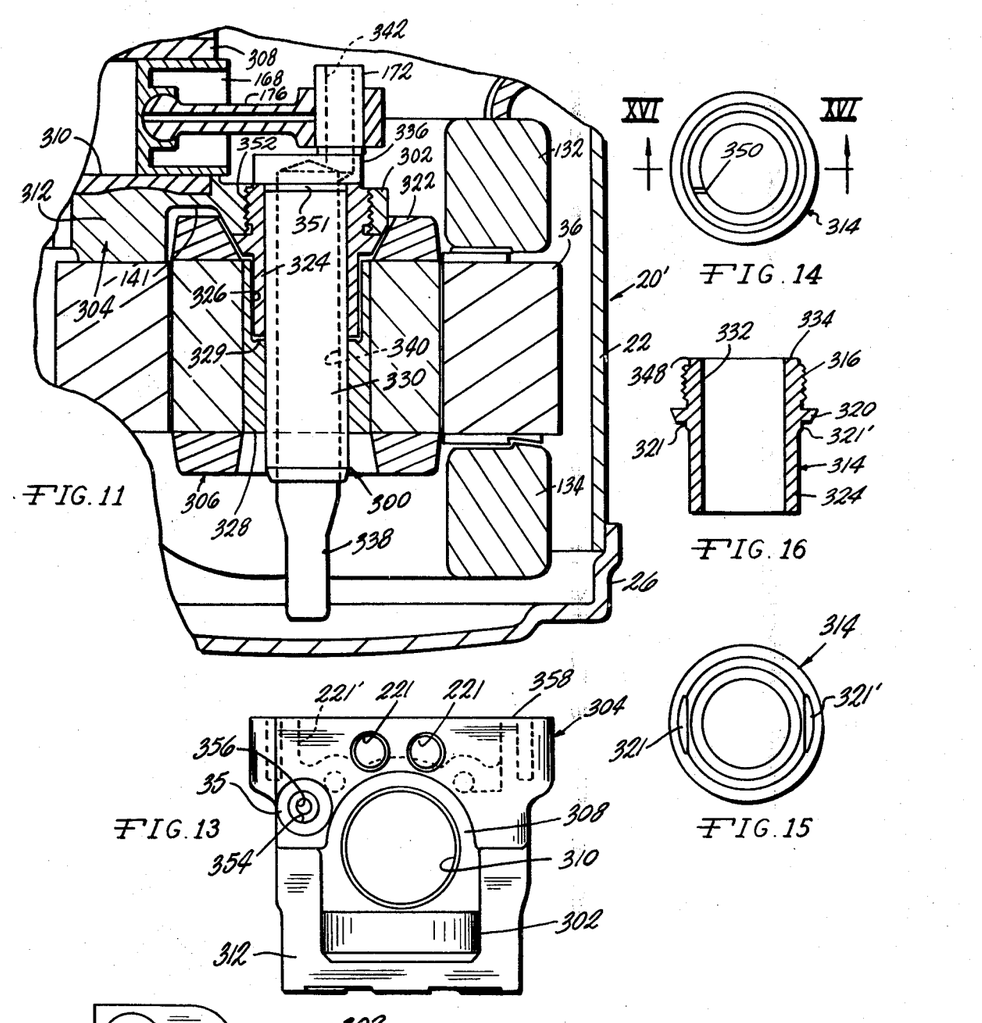
FIG. 11 is a fragmentary vertical sectional similar to that of FIG. 1 illustrating a second embodiment of an electric motor and pump construction in a hermetic compressor of the present invention.
FIGS. 12 and 13 are bottom plan and end elevational views respectively of a modified cylinder block and bearing support unit of the pump of FIG. 11.
FIGS. 14 and 15 are top and bottom plan views respectively of the main journal of the pump of FIG. 11.
FIG. 16 is a vertical sectional view taken on the line XVI—XVI of FIG. 14.
Figure 12:
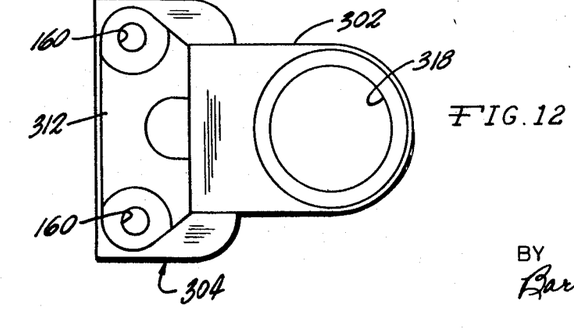

However, instead of the crankshaft being journaled directly in hub 302, the same is provided with a main journal insert 314 (shown by itself in FIGS. 14, 15 and 16). Journal insert 314 is preferably made of cold-rolled steel and provided with external screw threads 316 adjacent its upper end which are threadably received within the internally threaded bore 318 of hub 302. Insert 314 has an external flange 320 adapted to seat against the underside of hub 302.

As best seen in FIGS. 15 and 16, journal insert 314 is preferably provided with flats 321 and 321' in the lower corner of flange 320 and diametrically opposite one another to provide a convenient means for applying a wrench to screw the journal into hub 302. Both the lower corner of hub 302 and the outer surface of flange 320 are tapered to provide a clearance space between these tapered surfaces and the complimentary tapered inner surface of the upper end ring 322 of rotor 306. Insert 314 has a reduced diameter shank portion 324 extending downwardly from flange 320 to the lower free end of the insert which is adapted to nest with the clearance within a counterbore 326 in a core sleeve 328 of rotor 306. Sleeve 328 is supported on a shank portion 330 of shaft 300 with a press fit to secure the shaft for rotation with the rotor, the upper half of shank 330 being journaled for rotation within the bore 332 of insert 314. An axial thrust bearing to support the weight of the upright shaft 300 and rotor 306 is formed by the machined upper end surface 334 of journal 314 and the machined undersurface of an enlarged diameter head portion 336 of shaft 300.

Preferably a stepped cylindrical dip tube 338 as disclosed in U.S. Pat. No. 3,410,478 is secured to the lower end of shaft 300 to centrifugally pump oil up the hollow bore 340 of shaft 300 to a radially offset axially extending passage 342 in crankpin 172. Lubricating and cooling oil thus is pumped up to and slung from the upper end of crankshaft for lubrication of the shaft unibearing as well as the reciprocating piston 168 of the compressor pump. The upper rim 348 of insert 314 is provided with a slot 350 as shown FIG. 14 extending at an angle to a radius of the insert. Slot 350 is oriented to serve as an oil scraper for drawing oil into the annular space 351 between an undercut in shaft 330 and bearing bore 332 in response to counterclockwise rotation of shaft 300. The oil collecting on the upper surface 352 of hub 302 tends to drain to slot 350 and thus serves as a source of supply for oiling the upper end surface 334 as well as the bore 332 of insert 314.

With the above-described unibearing modification, the need for the previously described outboard bearing bracket 150 is eliminated. In addition, the relatively long axial dimension of the main journal insert 314 reduces the inboard bearing load and thus provides improved antifriction characteristics for this reason and due to the oil being fed into the upper end of bearing bore 332 via slot 350. Moreover, lubricating oil is also collected by the funnel-shaped clearance between end ring 322 and hub 302-flange 320, from which the oil drains into the lower end of the bearing bore 332 via the clearance space between shank 324 and counterbore 326. This clearance space is closed at its lower end by the shoulder 329 of the rotor sleeve 328. Hence these clearance spaces form an oil sump for feeding oil directly to shank 330, and the pressure head as well as capillary action forces the oil up into bore 332 of journal 314. Shoulder 329 also serves as a stop to limit axially upward movement of shaft 300 in the journal 314.

This unibearing design is advantageous in that the main journal insert may be precision machined and made of stronger, more wear resistant materials such as cold-rolled steel. Since the insert 314 is disposed centrally of the stator and is insulated magnetically from the stator by the aluminum material of block 304, it exerts a minimum magnetic influence on the core 36. All of the above factors contribute to longer bearing life and reduced starting resistance in the pump drive.

It is also to be understood that the above-described unibearing design may be constructed in one piece similar to the construction of the inboard bearing 140 of the previously described embodiment. In such a modification, the main journal is formed integrally with the bearing hub 302. In order to assemble the piston rod 176 to the crankshaft 300 in such modification, the rod is split at the big end thereof in accordance with conventional practice so that assembly of the piston rod can follow assembly of the crankshaft in the integral unibearing.

I claim:

1. In a hermetic compressor the improvement comprising an electric induction motor having a stator and a rotor, first and second run windings wound on said stator and disposed to form electrical field poles generally opposite one another diametrically of said rotor, said run windings having end turns projecting beyond both of the axially opposite ends of said stator, said end turns of said first and second windings being arranged in a horseshoe configuration at each of said ends of said stator so as to extend circumferentially of said stator adjacent one another and such that the end turns of both said first and second windings traverse one of said field poles and respectively define first and second gaps therein each exposing a portion of the adjacent surface of the associated end of said stator, said gaps being located in the vicinity of the other of said field poles, a piston-type compressor mounted on at least one of said exposed surface portions of said stator so as to be nested in the associated one of said gaps, means supporting said rotor for rotation in said stator, and means drivingly connecting said rotor to the piston of said compressor.

2. In the compressor as set forth in claim 1 the further improvement wherein said compressor has a cylinder block constructed of nonmagnetic material, said block being secured to said stator in the portion thereof axially between said gaps to support said compressor on said stator.

3. In the compressor as set forth in claim 2 the further improvement wherein said cylinder block has an inboard bearing bracket cast integrally therewith to form part of said rotor support means, the sides of said cylinder block and said inboard bearing bracket facing said stator having an annular notch therein, and wherein said rotor has an axial projection at the end thereof adjacent said block disposed for rotation through said annular notch.

4. In the compressor as set forth in claim 2 the further improvement wherein said rotor support means comprises an outboard bearing bracket made of nonmagnetic material and disposed in said second gap on the side of said stator opposite said cylinder block, and said outboard bearing bracket and cylinder block are clamped to said stator by fastening means extending axially through said stator to connections with said outboard bearing bracket and said block.

5. In the compressor as set forth in claim 1 the further improvement wherein said stator comprises a plurality of laminations of magnetic material secured to one another by an adhesive.

6. In the compressor as set forth in claim 1 the further improvement wherein said compressor is secured to said stator in said first gap by a plurality of fastener means disposed in said second gap and extending axially through said stator to connections with said compressor to thereby clamp said compressor against said one exposed surface portion, and means electrically insulating said fastener means from said stator and insulating said fastener means from one another at the ends of said fastener means located in said second gap.

7. In a hermetic compressor, the combination comprising a single phase alternating current induction motor having a stator and a rotor, first and second run windings and first and second start windings wound on said stator and having end turns projecting beyond the axially opposite ends of said stator, said end turns of said first run winding extending circumferentially of said stator adjacent the end turns of said second run winding, said end turns of all of said windings forming a horseshoe configuration at each of said ends of said stator defining first and second axially aligned gaps in said windings, each of said gaps exposing a portion of adjacent surface of the associated end of said stator, a piston-type compressor mounted on at least one of said exposed surface portions of said stator, and means drivingly connecting said rotor to the piston of said compressor, said run winding being arranged on a common axis extending diametrically of said rotor, said start windings being disposed generally opposite one another diametrically of said rotor and laterally of said common axis of said run windings and offset toward the portion of said stator diametrically opposite said gaps.

8. In the compressor as set forth in claim 7 the further improvement wherein said stator has a circular row of axially and radially extending winding slots arranged in a circular row therearound through a circumferential extent of approximately 300° with the ends of said row terminating on opposite sides of said gaps, said windings each comprising a plurality of coils each distributed in pairs of said slots.

9. In the compressor as set forth in claim 8 the further improvement wherein said plurality of slots consist of 20 slots numbered herein for identification consecutively one through 20 and spaced at equal angular intervals around said stator adjacent the inner periphery thereof with slots numbers one and 20 bounding said gaps, and wherein each of said windings consists of four coils, said four coils of said first run winding being wound through said slots numbered one through four and 17 through 20 and with the two runs of each coil of said first run winding disposed opposite one another on a line perpendicular to said common axis, said four coils of said second run winding being wound in like manner through said slots numbered five through eight and 13 through 16, said four coils of said first start winding being wound through slots one through four and seven through 10 and said four coils of said second start winding being wound through slots 11 through 14 and 17 through 20.

10. In an electric motor and pump unit having a stator with an annular core having a plurality of winding slots disposed in a circular row around the inner periphery of said core, the improvement wherein said stator core has an unslotted portion disposed between the ends of said row of slots, a series of field windings wound through said slots and having end turns projecting beyond each of the axially opposite end surfaces of said core, said end turns being arranged in a horseshoe configuration whereby a gap is formed in each of said end turns exposing a portion of each of said end surfaces axially aligned with said unslotted portion of said core, a pump unit mounted on said stator including a cylinder block secured to said unslotted portion of said core and disposed with its cylinder axis perpendicular to the axis of said stator, bearing means secured to the unslotted portion of said core and extending radially inwardly therefrom, a rotor shaft journaled in said bearing means coaxial with said stator and carrying a rotor thereon, and means forming a driving connection between said rotor and a piston received in said cylinder for imparting reciprocation to said piston in response to rotation of said rotor.

11. The motor-pump unit as set forth in claim 10 wherein said cylinder block and bearing means are constructed of nonmagnetic material.

12. The motor-pump unit as set forth in claim 11 wherein said stator core comprises a plurality of laminations of magnetic material secured to one another by an adhesive.

13. The motor-pump unit as set forth in claim 11 wherein said cylinder block has an inboard bearing bracket cast integrally therewith to form at least part of said bearing means, the side of said cylinder block and said inboard bearing bracket facing said core having an arcuate notch formed therein, and wherein said rotor has an axial projection at the end thereof adjacent said block disposed for rotation through said arcuate notch.

14. The motor-pump unit as set forth in claim 11 wherein said bearing means comprises an outboard bearing bracket disposed on the side of said core opposite said cylinder block and said outboard bearing bracket and cylinder block are clamped to said core by fastening means extending axially through said core to connections with said outboard bearing bracket and said cylinder block.

15. The motor-pump unit as set forth in claim 10 wherein said fastening means comprises a plurality of steel fasteners extending axially through said unslotted portion of said core, each fastener having at one end a threaded connection to said cylinder block and at the other end thereof a clamping connection with said core, and means electrically insulating said fasteners from said core and from one another at said other ends thereof.

16. In a hermetic compressor having a hermetic casing with an alternating current single phase electric motor and pump unit resiliently supported therein, the improvement comprising an annular laminated stator core having a plurality of winding slots disposed in a circular row around the inner periphery of the stator, said stator core having an unslotted portion disposed between the ends of said row of slots, a pair of run windings and a pair of start windings wound in a distributed manner through said slots, said windings having end turns projecting beyond the axially opposite end surfaces of said core and together forming a horseshoe configuration at each of the axially opposed ends of said core to thereby define axially aligned gaps in said end turns registering with said unslotted portion of said core, said pump unit including a cylinder block secured to said unslotted portion of said core and disposed with its cylinder axis perpendicular to the axis of said stator, inboard and outboard bearing means mounted respectively to the axially opposite surfaces of said unslotted portion of said stator and extending radially inwardly therefrom, a rotor shaft journaled in said bearing means coaxial with said stator and carrying a rotor therein, and means forming a driving connection between said rotor and a piston received in said cylinder for imparting reciprocation to said piston in response to rotation of said rotor.

17. In a hermetic compressor having a hermetic casing with an electric motor and pump unit supported therein, the improvement comprising a stator core having an unslotted portion disposed between windings wound on said core and having first end turns projecting beyond one end of said core and second end turns projecting beyond the axially opposite end of said core, said end turns being arranged to define first and second gaps in said first and second end turns respectively, said gaps registering with said unslotted portion of said core, said pump unit including a cylinder block secured to said unslotted portion of said core at said one end thereof and disposed with its cylinder axis perpendicular to the axis of said stator, inboard bearing means cantilever connected to said block and extending radially inwardly from said cylinder block and terminating short of the portion of the inner periphery of said core radially opposite said unslotted portion, a rotor shaft journaled in said bearing means coaxial with said stator and carrying a rotor thereon and means forming a driving connection between said rotor and a piston received in said cylinder for imparting reciprocation to said piston in response to rotation of said rotor.

18. The compressor as set forth in claim 17 wherein said inboard bearing means comprises a hub having a bore concentric with said rotor shaft and a main journal insert secured in said hub bore and coaxially dependent therefrom, said insert having a bore in which said rotor shaft is journaled.

19. The compressor as set forth in claim 18 wherein said insert has a sleeve extending axially from said hub and terminating between said ends of said core, said rotor having a sleeve secured to said rotor shaft between said sleeve of said insert and said opposite end of said core, said rotor axially overlapping and encircling said sleeve of said insert and defining therewith an annular cavity for collecting lubricant and supplying the same to said rotor shaft between said insert sleeve and said rotor sleeve.

20. The compressor as set forth in claim 19 wherein said main journal insert has a radially projecting external flange adapted to abut said hub on the side thereof facing said rotor, and said hub bore and said insert have mating threads whereby said insert may be screwed into said bore to bring said flange into abutment with said hub.

21. The compressor as set forth in claim 20 wherein said insert has a bearing surface at the end thereof opposite said sleeve of said insert and disposed in a plane perpendicular to the axis of said rotor shaft, and said rotor shaft has a head radially overlapping said end bearing surface of said insert, said head having a bearing surface seating on said insert bearing surface to form an axial thrust bearing for said rotor shaft.

22. The compressor as set forth in claim 21 wherein said one end of said insert has a slot extending between the bore of said insert and the exterior of said insert, said slot being covered by said head of said rotor shaft and serving to feed oil to said insert bore, said hub having a surface encircling said insert generally flush with said slot to feed oil to said slot.

23. The compressor as set forth in claim 18 wherein said block and hub are cast integrally as a unit from a structural aluminum alloy and said insert is made of steel.

24. The compressor as set forth in claim 17 further including an outboard bearing means cantilever connected to said unslotted portion of said core at said opposite end thereof and extending radially inwardly therefrom, said outboard bearing means having a hub portion coaxial with said rotor shaft and spaced axially from said inboard means, said rotor shaft being journaled in said inboard and outboard bearing means, said rotor being secured to said rotor shaft intermediate said inboard and outboard bearing means.

25. The compressor as set forth in claim 24 wherein said cylinder block and said outboard bearing means are clamped to said unslotted portion of said core by fastener means extending axially through said unslotted portion of said stator core and having connections with said block and said outboard bearing means.

26. The compressor as set forth in claim 25 wherein said fastener means comprise a plurality of steel studs each threaded at one end into said cylinder block, and including means electrically insulating said studs from said core and from said outboard bearing means.